United States Patent [19]

Sumiya et al.

[11] Patent Number: 4,712,635

[45] Date of Patent: Dec. 15, 1987

[54] CONTROL APPARATUS FOR FOUR-WHEEL DRIVE VEHICLE

[75] Inventors: Koji Sumiya, Tokyo; Shuzo Moroto, Handa, both of Japan

[73] Assignees: Aisin-Warner Kabushiki Kaisha, Anjo; Kabushiki Kaisha Shinsangyokaihatsu, Tokyo, both of Japan

[21] Appl. No.: 947,225

[22] Filed: Dec. 29, 1986

[30] Foreign Application Priority Data

Jan. 13, 1986 [JP] Japan .................................... 61-4820

[51] Int. Cl.$^4$ .............................................. B60T 8/10
[52] U.S. Cl. .................................... 180/197; 180/249
[58] Field of Search ............... 180/197, 249, 248, 271; 280/707; 364/424, 424.1

[56] References Cited

U.S. PATENT DOCUMENTS 4,346,774  8/1982  Hirota et al. ....................... 180/197
4,552,241 11/1985  Suzuki ................................. 180/249
4,595,072  6/1986  Barnea ................................. 280/707

FOREIGN PATENT DOCUMENTS 2712199  9/1978  Fed. Rep. of Germany ...... 180/271

Primary Examiner—John J. Love
Assistant Examiner—Donn McGrehan
Attorney, Agent, or Firm—Wegner & Bretschneider

[57] ABSTRACT

The coefficient of friction of a road surface lying ahead of a four-wheel drive vehicle is predicted and, if control performed on the basis of the prediction is incorrect, the coefficient of friction of the road surface actually traversed by the vehicle is calculated, thereby revising the prediction so that the next prediction of coefficient of friction will be more accurate. Accordingly, control for changeover between two- and four-wheel drive or for locking a center differential mechanism can be made to conform to the road surface conditions immediately and in an appropriate manner to prevent skidding or lock-up of the tires and, hence, assure a safe and stable traveling state.

3 Claims, 2 Drawing Figures

CONTROL APPARATUS FOR FOUR-WHEEL DRIVE VEHICLE

BACKGROUND OF THE INVENTION

This invention relates to a four-wheel drive vehicle control apparatus for controlling changeover between two- and four-wheel drive or the locking of a center differential mechanism by sensing the coefficient of friction between a road surface and the tires of the vehicle.

In order to keep a four-wheel drive vehicle in an appropriate traveling state despite changes in the road surface on which the vehicle is running, a four-wheel drive control system has been proposed in which the vehicle is switched over to a control mode different from that of the simple four-wheel drive traveling mode whenever necessary.

Such a control system is of two different types. One is a part-time four-wheel drive system in which, in accordance with the road surface conditions, a changeover can be made whenever necessary between two-wheel drive in which either the front or rear wheels are driven and four-wheel drive in which both the front and rear wheels are driven.

The other type of control system is a full-time four-wheel drive system having a center differential mechanism for absorbing a difference in turning radius that develops between the front and rear wheels at cornering. In order to make it possible to switch the control mode in accordance with the road surface conditions, this system is provided with a locking mechanism for direct transfer between the front and rear wheels without the intervention of the center differential mechanism. The center differential mechanism is locked when a large driving force is necessary, as at acceleration or during travel on a poor road surface, and unlocked during ordinary travel when a large driving force is not required.

In general, control for switching between two- and four-wheel drive in the part-time configuration or for locking the center differential mechanism in the full-time arrangement is a manual operation performed by the driver based on his or her judgment of the road surface conditions. Recently, however, a system has been proposed in which such control is executed automatically by comparing the engine driving force and the force acting upon the wheels of the vehicle. A vital factor for achieving safe and stable vehicle travel with such a system is how to sense the coefficient of friction between the road surface and a tire accurately when calculating the force acting upon the wheel. In the prior art, a sensor is brought into contact with the road surface to sense the coefficient of friction between the road surface and tire so that measures can be taken to deal with the coefficient of friction and road surface condition.

However, with the foregoing conventional method, the state of the road surface on which the vehicle is currently traveling can be judged but not the road surface conditions ahead of the vehicle. Accordingly, since the coefficient of friction between a tire and the road surface lying ahead of the vehicle cannot be sensed, there are cases where the changeover between two-wheel/four-wheel drive or the locking of the center differential mechanism is not controlled appropriately when the conditions of the road surface change. This can lead to tire skidding or lock-up. Thus, in the conventional arrangement, a suitable response to the road surface conditions may be delayed. This can have a detrimental effect upon the safety and stability of vehicle travel.

Furthermore, even if the coefficient of friction between a tire and the road surface ahead of the traveling vehicle could be sensed, the value would be an estimate at best and would not necessarily coincide with the actual coefficient of friction encountered when the particular section of the road is traversed. Tire skidding and lock-up could result unless appropriate control is performed.

SUMMARY OF THE INVENTION

An object of the present invention is to prevent tire skidding and lock-up by precisely predicting the coefficient of friction of a road surface lying ahead of a traveling vehicle, calculating the coefficient of friction of the road surface actually traversed if control based on the prediction is erroneous, and revising the prediction, thereby bringing control for changeover between two- and four-wheel drive or for locking a center differential mechanism into conformance with the road surface conditions immediately and in an appropriate manner to assure a safe and stable traveling state.

In general, the coefficient of friction $\mu$ between a tire and road surface is determined by the condition of the road surface. A concrete pavement, a dry earth surface, a gravel road, a snow-covered road and an iced-over road exhibit successively lower coefficients of friction. The condition of a road surface may be obtained as the light intensity of each of three primary colors, namely the red component (R), green component (G) and blue component (B) of light. It has been clarified by experimentation that if the intensity is expressed in a three-dimensional coordinate system having R, G and B as its axes, expression in the form of a map differentiated by road surface condition is possible, as shown in the memory means 4 of FIG. 1. Accordingly, if the condition of a road surface is obtained as the light intensity of the three primary color components red (R), green (G) and blue (B), then the coefficient of friction can be sensed by judging the condition of the road surface. Further, since the coefficient of friction $\mu$ between the road surface and a tire differs depending upon the temperature of the road surface, it is possible to sense a coefficient of friction $\mu_{nn}$ dependent upon both the road surface condition and road surface temperature, as shown in the memory 4 of FIG. 1, by taking the effect of temperature into account.

However, since $\mu$ varies considerably depending upon tire profile and wear, it is necessary to rewrite the stored data on the basis of results obtained from actual travel.

Accordingly, to attain the foregoing ends, the present invention provides a four-wheel drive vehicle control apparatus comprising pick-up means mounted on the vehicle for picking up an image of a road ahead of the vehicle, memory means for storing a coefficient of friction of the road surface corresponding to an output signal from the pick-up means, decision means for judging the coefficient of friction of the road surface by comparing data stored in the memory means and the output signal from the pick-up means, driving decision means for driving an actuator in response to an output signal from the decision means, and torque sensing means arranged on front and/or rear wheels of the vehicle. If it is judged that a tire will skid or lock-up by the torque sensing means, the coefficient of friction of the road surface is calculated in response to an output signal from the torque sensing means and the coefficient of the road surface stored in the memory means is revised.

Thus, in accordance with the invention, the coefficient of the road surface lying ahead of the vehicle is estimated precisely and, if control performed based on the prediction is incorrect, the prediction is revised by calculating the coefficient of friction actually encountered by travel on the road. This has the effect of raising the accuracy of the next prediction of coefficient of friction. Accordingly, control for changeover between two- and four-wheel drive or for locking a center differential mechanism can be made to conform to the road surface conditions immediately and in an appropriate manner to prevent skidding or lock-up and, hence, assure a safe and stable traveling state.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
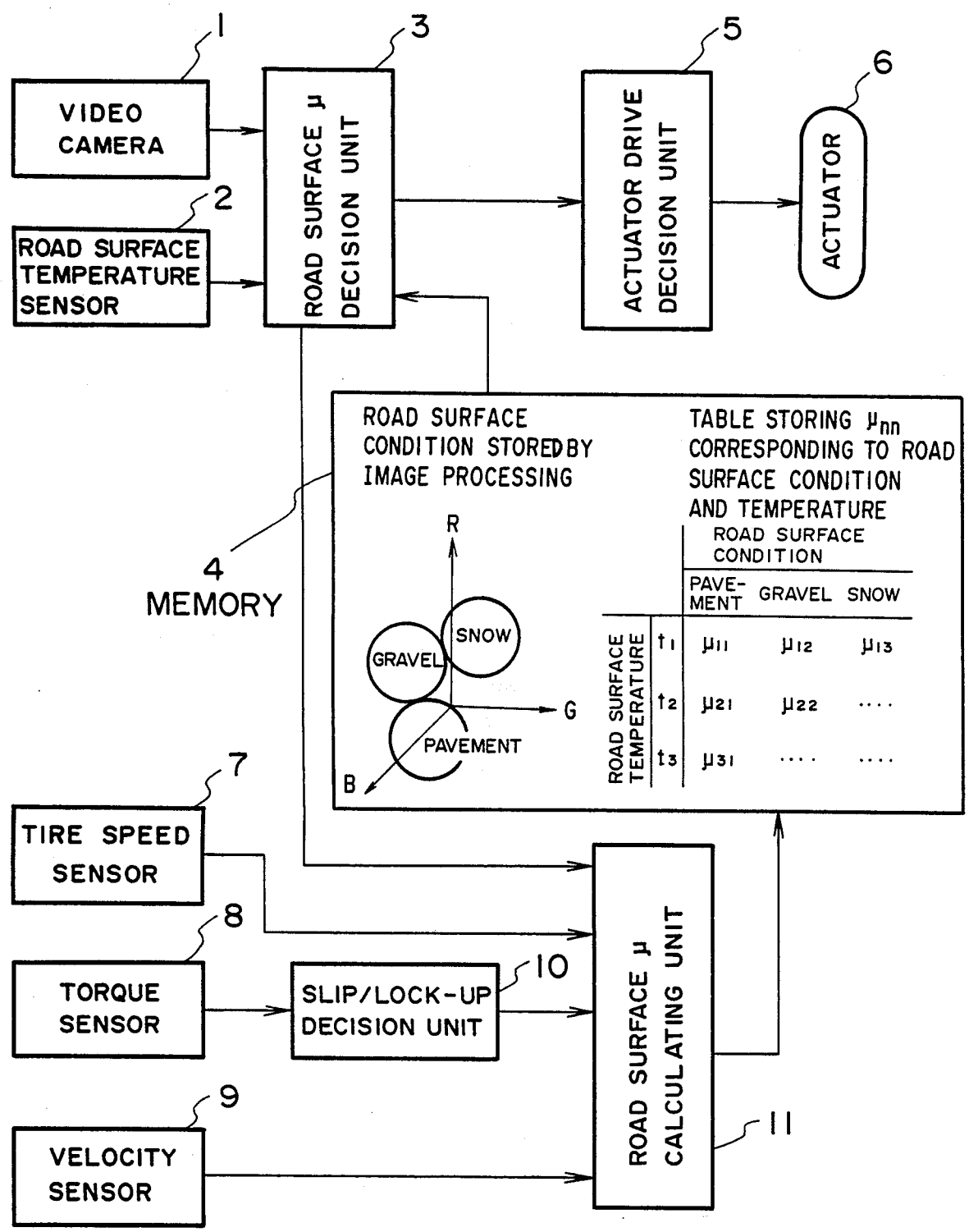
FIG. 1 is a block diagram illustrating an embodiment of control circuitry in the control apparatus of the present invention.

With reference to FIG. 1, there is shown a video camera 1 mounted on the front of a vehicle for picking up the image of the road surface condition lying ahead of the traveling vehicle. A road surface temperature sensor 2 is a contactless-type thermometer such as a radiation thermometer or current collecting-type thermometer and is adapted to sense the temperature of the road surface ahead of the vehicle by measuring infrared energy radiated from the road surface. A decision unit 3 for predicting the coefficient of friction of the road surface receives the image outputted by the video camera and separates the image into signals indicative of the three primary color components red (R), green (G) and blue (B) of light by means of image processing. The decision unit 3 performs a comparison by applying these signals to three-dimensional coordinates stored in memory means 4, described below, thereby predicting the road surface condition, which corresponds to the intensities of the respective color component signals. Furthermore, based on the information of the predicted road surface condition and the output signal of the road surface temperature sensor 2, the decision unit 3 judges a coefficient of friction $\mu_{nn}$ stored in the memory means 4. The memory means 4 stores various road surface conditions equivalent to a paved road, gravel road and snow-covered road, as a discriminatable map in three-dimensional coordinates comprising the red component (R), green component (G) and blue component (B). The map is prepared by picking up the image of various road surface conditions in advance using the video camera, and then processing the images received. Values of the coefficient of friction $\mu_{nn}$ corresponding to road surface condition and road surface temperatures are also prepared in advance by actual measurement, and these values are stored in memory means 4 in the form of a table. The decision unit 3 produces an output signal, which is indicative of the predicted value of $\mu$, and applies the signal to an actuator drive decision unit 5, which decides whether or not to drive an actuator 6.

The front- and/or rear-wheel axle is provided with a wheel speed sensor 7 and wheel torque sensor 8. If a tire skids or locks up, namely if the prediction of the coefficient of friction made by the decision unit 3 is incorrect, a skid/lock-up decision unit 10 is operable to apply the output of the torque sensor 8 to an arithmetic unit 11 for calculating the coefficient of friction of the road surface. The arithmetic unit 11 is adapted to calculate the coefficient of friction on the basis of the torque signal from torque sensor 8 and an acceleration signal obtained from an accelerator sensor 9. The coefficient of friction thus calculated is inputted to the memory means 4 to write in the correct coefficient of friction in place of the incorrectly predicted coefficient of friction. To this end, the decision unit 3 for judging the coefficient of friction provides the arithmetic unit 11 with a signal designating the address of the table storing the coefficients of friction in the memory means 4. Taking the influence of acceleration into account, the arithmetic unit 11 calculates ground contact load of the tire and obtains the coefficient of friction from the torque.

Figure 2:
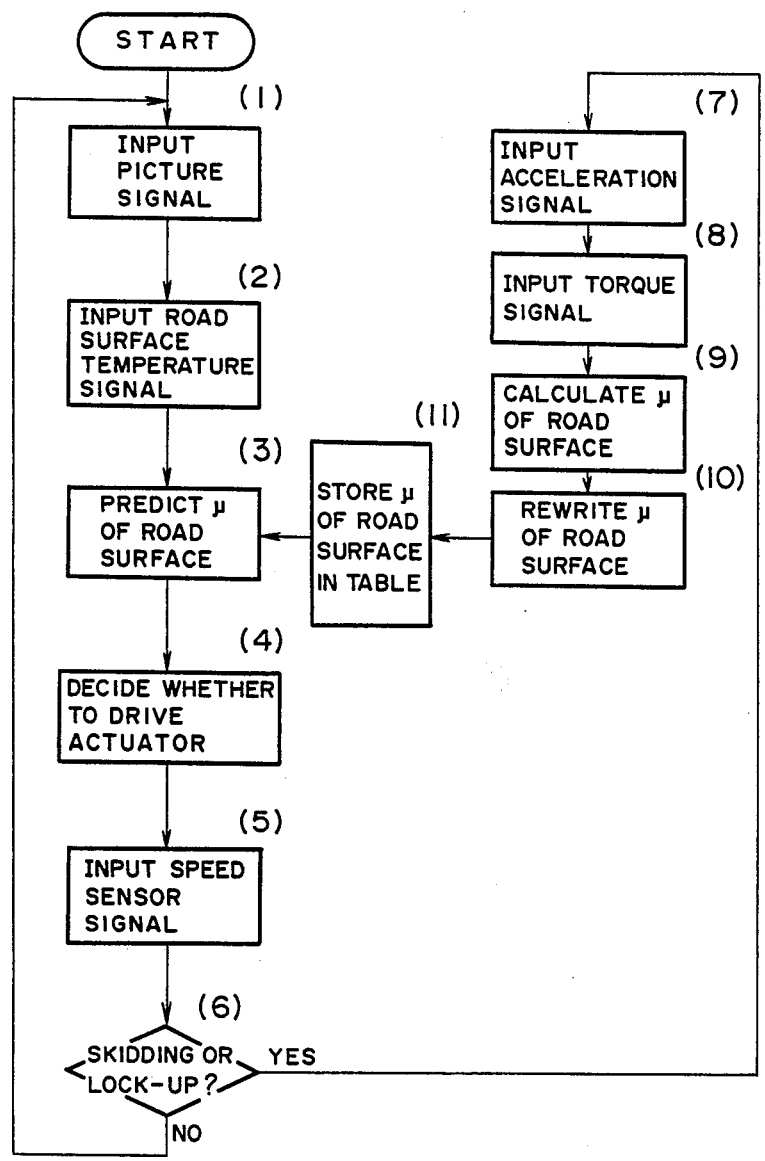
FIG. 2 is a flowchart of processing performed by the control apparatus of the invention.

Let us now describe processing executed by the control apparatus of the invention with reference to the flowchart of FIG. 2.

In steps (1) and (2) of the flowchart, the picture signal from the video camera 1 and the temperature signal from the road surface temperature sensor 2 are inputted to the road surface $\mu$ decision unit 3, which then proceeds to compare these signals with the table in memory means 4 storing the values of the coefficient of friction $\mu_{nn}$ of the road surface, thereby predicting at step (3) the coefficient of friction of the road lying ahead of the traveling vehicle. The decision unit 3 outputs the predicted value of the coefficient of friction to the actuator drive decision unit 5 which, based on the predicted value, determines whether an actuator is to be driven. Specifically, assume that the vehicle is currently traveling on a paved road. If the decision unit 3 has predicted that the coefficient of friction of the road surface lying ahead of the vehicle has a low value, such as would be the case if the oncoming road surface were snow covered, then the actuator drive decision unit 5 drives an actuator to either switch from two- to four-wheel drive or lock the center differential mechanism. This takes place at step (4) of the flowchart. Next, the signal from the speed sensor 7 is inputted at a step (5), and the slip/lock-up decision unit 10 determines at a step (6) whether the decision to drive the actuator was a proper one. More specifically, if the initially predicted coefficient of friction is correct, then driving the actuator is justified and the speed sensor 7 will output a value corresponding to the coefficient of friction of the road surface. If the predicted coefficient of friction is incorrect, on the other hand, then the actuator will perform an improper operation, such as leaving two-wheel drive in effect when a changeover to four-wheel drive is required. As a result, tire skidding or lock-up will occur and the speed sensor 7 will output an abnormal value.

If tire skidding or lock-up does not occur, then the foregoing processing of steps (1) through (6) is repeated. If a tire skids or locks up, on the other hand, the arithmetic unit 11 calculates, at a step (9), the correct value of the coefficient of friction of the road surface actually traversed from the acceleration signal and torque signal inputted at steps (7) and (8), respectively. Next, at steps (10) and (11), this correct value is written into the table of memory means 4 in place of the incorrect value. Thereafter, the coefficient of friction of the road surface will be judged using this revised value.

It should be noted that the invention is not limited to the above-described embodiment but can be modified in various ways. For example, in the embodiment, coefficient of friction is judged based on the image and temperature of the road surface. However, coefficient of friction can be judged to a certain degree of accuracy based solely on the image of the road surface.

Further, in the illustrated embodiment, the coefficient of friction of a road surface actually traversed is calculated on the basis of torque, acceleration and the load of the tire in contact with the ground. However, the coefficient of friction can be calculated to a certain degree of accuracy based solely on torque and tire load, with the effects of acceleration being neglected.

In the illustrated embodiment, tire skidding or lock-up is judged based on outputs from the speed sensor 7 and torque sensor 8. However, it is possible to adopt an arrangement in which tire skidding or lock-up is judged by calculating engine output torque from engine rpm, throttle opening and the like, and drawing the calculated output torque into comparison with wheel torque.

What we claim is:

1. A control apparatus for a four-wheel drive vehicle having an actuator for controlling changeover between two- and four-wheel drive or locking of a center differential mechanism, comprising:
   pick-up means mounted on the vehicle for picking up an image of a road surface lying ahead of the vehicle;
   memory means for storing a coefficient of friction of the road surface corresponding to an output signal from said pick-up means;
   decision means for judging the coefficient of friction of the road surface by comparing data stored in said memory means and the output signal from said pick-up means;
   driving decision means for driving the actuator in response to an output signal from said decision means; and
   torque sensing means arranged on front and/or rear wheels of the vehicle for sensing the torque of the front and/or rear wheels;
   wherein if it is judged by said torque sensing means that tire skidding or lock-up has occurred, the coefficient of friction of the road surface is calculated in response to an output signal from the torque sensing means and the coefficient of the road surface stored in said memory means is revised.

2. The apparatus according to claim 1, wherein said decision means judges the coefficient of friction of the road surface based on the intensity of each of the three primary color components of light.

3. The apparatus according to claim 1, wherein said torque sensing means comprises a wheel speed sensor and a wheel torque sensor, with tire skidding or lock-up being judged based on output signal from said wheel speed sensor.

* * * * *